(12) United States Patent
Stawiarski et al.

(10) Patent No.: US 11,653,258 B2
(45) Date of Patent: *May 16, 2023

(54) MANAGEMENT OF OVERLOAD CONDITION FOR 5G OR OTHER NEXT GENERATION WIRELESS NETWORK

(71) Applicants: AT&T Intellectual Property I, L.P., Atlanta, GA (US); AT&T Mobility II LLC, Atlanta, GA (US)

(72) Inventors: Slawomir Stawiarski, Carpentersville, IL (US); Mochamad Mirza, Alpharetta, GA (US); Arthur Brisebois, Cumming, GA (US); Vladimir Gusavac, Dunwoody, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/246,795

(22) Filed: May 3, 2021

(65) Prior Publication Data

US 2021/0258825 A1 Aug. 19, 2021

Related U.S. Application Data

(63) Continuation of application No. 16/536,092, filed on Aug. 8, 2019, now Pat. No. 11,032,735.

(51) Int. Cl.
*H04W 28/02* (2009.01)
*H04W 36/22* (2009.01)

(52) U.S. Cl.
CPC ... *H04W 28/0289* (2013.01); *H04W 28/0284* (2013.01); *H04W 36/22* (2013.01)

(58) Field of Classification Search
CPC ......... H04W 28/0289; H04W 28/0284; H04W 36/22
See application file for complete search history.

(56) References Cited

U.S. PATENT DOCUMENTS 8,787,331 B2 * 7/2014 Liu .................. H04W 28/0268
370/338
9,185,664 B2 * 11/2015 Park ..................... H04W 52/40
(Continued)

OTHER PUBLICATIONS

Notice of Allowance received for U.S. Appl. No. 16/536,092 dated Feb. 4, 2021, 58 pages.

*Primary Examiner* — Parth Patel
(74) *Attorney, Agent, or Firm* — Amin, Turocy & Watson, LLP

(57) ABSTRACT

A system that can detect a congested network node device that is overloaded due to number of user equipment (UE) devices connected to the network node device being determined to have exceeded a connection threshold; determine a second network node device that is available to establish connections with at least some of the UEs connected to the congested network node device; identify a third network node device that is transferring UE devices to the congested network node device to create additional connections; and transmit a cell individual offset (CIO) parameter and cell hysteresis offsets to the third network node device to reduce transferring UE devices to the congested network node device, and another CIO parameter and cell hysteresis offsets to the second network node device to increase establishment of the UE connection from the congested network node device.

20 Claims, 11 Drawing Sheets

(56) References Cited

U.S. PATENT DOCUMENTS

| | | | |
|---|---|---|---|
| 9,510,229 B2* | 11/2016 | Berggren | H04W 36/00837 |
| 10,470,007 B1* | 11/2019 | Osborn | H04L 65/103 |
| 10,820,243 B2* | 10/2020 | Halepovic | H04L 43/0882 |
| 10,862,805 B1* | 12/2020 | Dods | H04L 41/145 |
| 10,869,248 B1* | 12/2020 | Oroskar | H04W 36/14 |
| 2007/0293235 A1* | 12/2007 | Inayoshi | H04W 36/18 455/436 |
| 2010/0144363 A1* | 6/2010 | De Rosa | H04W 52/0206 455/452.1 |
| 2012/0236717 A1* | 9/2012 | Saska | H04W 36/22 370/235 |
| 2013/0336283 A1* | 12/2013 | Wong | H04W 36/22 370/331 |
| 2015/0098393 A1* | 4/2015 | Tofighbakhsh | H04W 28/02 370/329 |
| 2015/0103657 A1* | 4/2015 | Henderson | H04W 28/0284 370/232 |
| 2015/0282045 A1* | 10/2015 | Salem | H04W 28/08 370/329 |
| 2016/0234851 A1* | 8/2016 | Zhang | H04W 72/08 |
| 2017/0251341 A1* | 8/2017 | Frost | H04L 12/189 |
| 2017/0311216 A1* | 10/2017 | Mythri Hunukumbure | H04L 67/12 |
| 2017/0318479 A1* | 11/2017 | Ootanis | H04L 43/16 |
| 2018/0054749 A1* | 2/2018 | Kim | H04W 36/0085 |
| 2018/0167277 A1* | 6/2018 | Mahimkar | H04L 41/082 |
| 2018/0199237 A1* | 7/2018 | Vare | H04W 28/08 |
| 2018/0249367 A1* | 8/2018 | Rosa | H04W 28/12 |
| 2018/0255480 A1* | 9/2018 | Yang | H04W 76/10 |
| 2018/0324655 A1* | 11/2018 | Comstock | H04W 88/06 |
| 2019/0007873 A1* | 1/2019 | Kumar Parameswarn Rajamma | H04W 36/22 |
| 2019/0014001 A1* | 1/2019 | Tamura | H04L 41/0806 |
| 2019/0075563 A1* | 3/2019 | Babaei | H04L 5/003 |
| 2019/0132752 A1* | 5/2019 | Qiao | H04W 28/08 |
| 2019/0208450 A1* | 7/2019 | Zait | H04W 36/30 |
| 2019/0274066 A1* | 9/2019 | Lai | H04W 36/22 |
| 2020/0007435 A1* | 1/2020 | Paida | H04L 43/0894 |
| 2020/0059824 A1* | 2/2020 | Yang | H04W 28/08 |
| 2020/0068453 A1* | 2/2020 | Wang | H04W 24/10 |
| 2020/0100143 A1* | 3/2020 | Mena | H04L 47/22 |
| 2020/0145335 A1* | 5/2020 | Wijnands | H04L 45/60 |
| 2020/0178132 A1* | 6/2020 | Niu | H04W 24/08 |
| 2020/0187064 A1* | 6/2020 | Susitaival | H04W 36/08 |
| 2020/0196191 A1* | 6/2020 | Deparisse | H04L 43/0888 |
| 2020/0275313 A1* | 8/2020 | He | H04W 28/08 |
| 2020/0396658 A1* | 12/2020 | Szilagyi | H04W 36/0079 |
| 2021/0345211 A1* | 11/2021 | Keskitalo | H04W 84/047 |
| 2022/0030623 A1* | 1/2022 | Wang | H04W 74/0808 |
| 2022/0038975 A1* | 2/2022 | Da Silva | H04W 36/08 |
| 2022/0110039 A1* | 4/2022 | Soldati | H04W 36/22 |
| 2022/0132603 A1* | 4/2022 | Adjakple | H04W 8/005 |
| 2022/0141738 A1* | 5/2022 | Chou | H04L 41/5051 455/437 |

* cited by examiner

MANAGEMENT OF OVERLOAD CONDITION FOR 5G OR OTHER NEXT GENERATION WIRELESS NETWORK

RELATED APPLICATION

The subject patent application is a continuation of, and claims priority to, U.S. patent application Ser. No. 16/536,092, filed Aug. 8, 2019, and entitled "MANAGEMENT OF OVERLOAD CONDITION FOR 5G OR OTHER NEXT GENERATION WIRELESS NETWORK," the entirety of which application is hereby incorporated by reference herein.

TECHNICAL FIELD

This disclosure relates generally to management of overload condition in a wireless network. More specifically, facilitating management of network node devices that are overloaded, e.g., for 5th generation (5G) or other next generation wireless network.

BACKGROUND 5G wireless systems represent a next major phase of mobile telecommunications standards beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. 5G research and development also aims reduce congestion at network node devices (e.g., base stations). In 5G, a central controller can manage resources and performance of several network node devices. For example, network communication devices (e.g., user equipment—UE) are distributed across network and network node devices. Every time a UE device establishes a connection to a network node device, it consumes resources. The resources are limited and can be exhausted if large number of UE devices are connecting to the network node device, thereby causing congestion or overloading the network node device.

The above-described background relating to network node device congestion, is merely intended to provide a contextual overview of some current issues, and is not intended to be exhaustive (e.g., although problems and solution are directed to next generation networks such as 5G, the solutions can be applied to 4G/long term evolution (LTE) and or 5G LTE-new radio technologies). Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
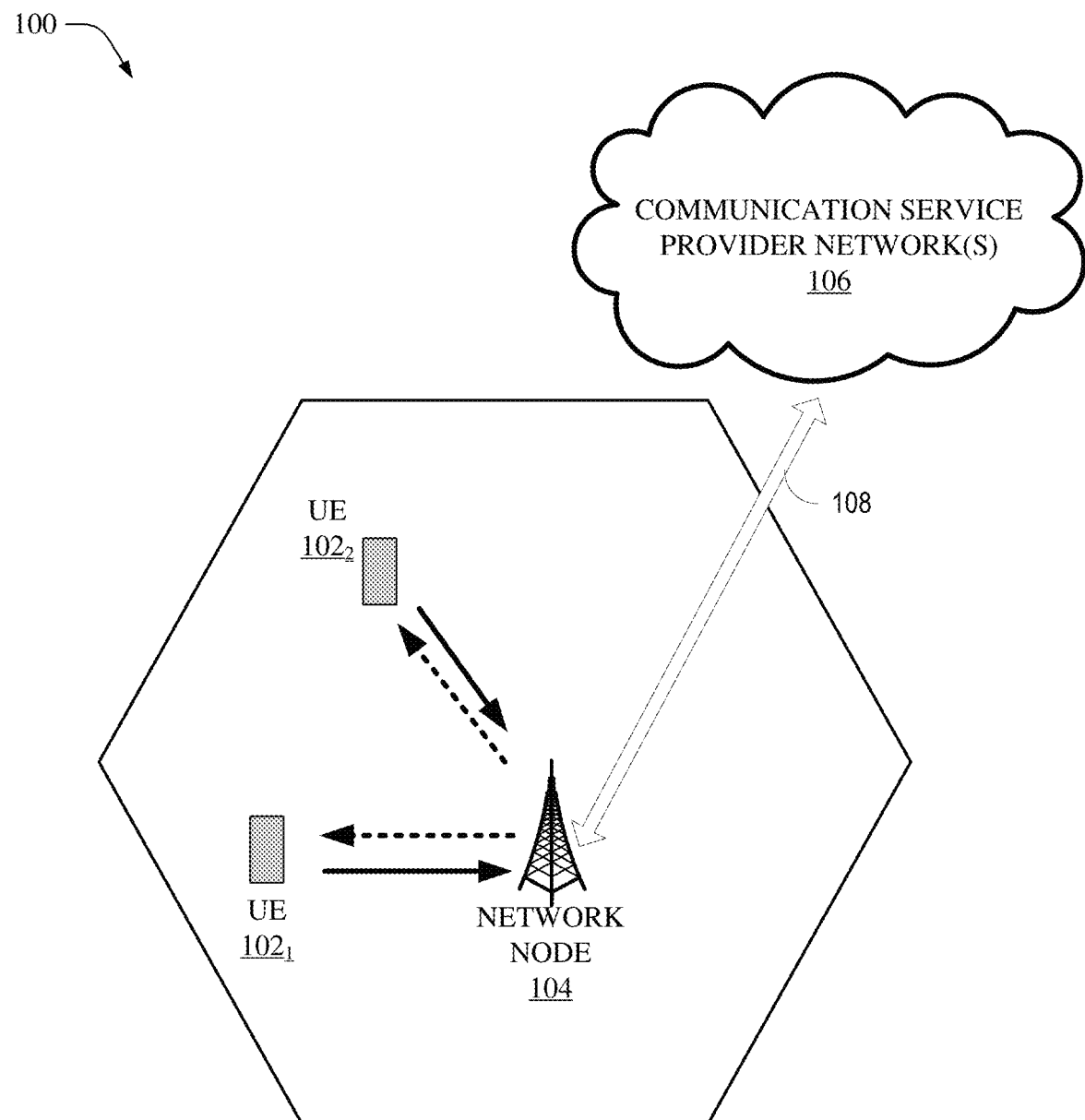
FIG. 1 illustrates an example wireless communication system in which a network node device and (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate management of network node devices that are overload. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate management of a network node device that is overloaded. Facilitating management of a network node device that is overloaded can be implemented in connection with any type of device with a connection to the communications network (e.g., a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node device, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, evolved Node B (eNB or eNodeB), next generation Node B (gNB or gNodeB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller (e.g., controller, central controller, or centralized unit) that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

In LTE systems, a central controller (e.g., a core network) manages resources and performance of several network node devices. For example, UE devices are distributed across network and network node devices (e.g., e/gNodeB, base stations, etc.). Every time a UE device establishes a connection to a network node device (e.g. cell of a network node device), it consumes resources. The resources in this case, physical downlink control channel (PDCCH) control channel elements (CCE) are limited and can be exhausted if large number of UE devices attempts connecting to the network node. The resource exhaustion results in UE connection establishment rejection (access failure) and throughput degradation for the UE devices already connected to a congested cell. This can cause poor user experience for the cell phone users. A congestion and high utilization of resources in a network node device can negatively impact all types of devices and users, including regular customers, high priority service devices and priority customers (e.g., first responders).

According to some embodiments, a traffic offload management system is described herein that can manage offloading of traffic (e.g., UE connections) to reduce congestion at the overloaded/congested network node device. In some embodiments, to improve the UE and network node device performance (e.g., reduce high load on cells, reduce or remove establishment rejections occurrence and improve throughput and user performance) on overloaded network node device, the system moves traffic from overloaded network node device to other neighboring that are not overloaded or have available capacity. In addition, the system can reduce or control incoming traffic from other neighboring network node devices until the congestion at the congested network node is reduced. In some embodiments, the system uses a combination of coordinated parameter changes on detected overloaded network node device and neighboring network node devices to increase acceptance of traffic from overloaded network node device and reduce transferring traffic to the overloaded network node device (e.g., reduce the number of UE being transferred to the already overloaded network node device). The parameters are optimized as a group of network node devices rather than one network node. The system can determine parameter settings for the overloaded network node device and neighboring network node devices based on predicted performance of the affected network node devices (e.g., group of network node devices).

According an embodiment, a system can comprise a processor and a memory that stores executable instructions that, when executed by the processor, facilitate performance of operations comprising detecting a first network node device that is overloaded due to a number of a first group of first network communication devices connected to the first network node device being determined to have exceeded a connection threshold. The system can further facilitate selecting a second network node device comprising resources available to create first connections with at least some of the first group of first network communication devices connected to the first network node device. The system can further facilitate identifying a third network node device that is transferring a second group of second network communication devices, different than the first group of first network communication devices, to the first network node device to create second connections with the first network node device. The system can further facilitate transmitting a first parameter to the third network node device to facilitate a reduction in the transferring of the second group of second network communication devices to the first network node device, and a second parameter to the second network node device to facilitate increase in establishment of the first connections of the first group of first network communication devices with the second network node device.

According to another embodiment, described herein is a method that can comprise identifying, by a device comprising a processor, a first network node device that is overloaded based on a channel usage value determined to be above a threshold due to first network communication devices connected to the first network node device. The method can further comprise determining, by the device, a second network node device that is available to establish first connections with at least some of the first network communication devices connected to the first network node device. The method can further comprise identifying, by the device, a third network node device that is transferring second network communication devices to the first network node device to create second connections with the first network node device. The method can further comprise facilitating, by the device, transmitting a first parameter to the third network node device to facilitate a reduction in the transferring of the second network communication devices to the first network node device, and facilitating, by the device, transmitting a second parameter to the second network node device to facilitate increase in establishment of the first connections with the first network communication devices.

According to yet another embodiment, a device can comprise a processor and a memory that stores executable instructions that, when executed by the processor, facilitate performance of operations comprising detecting a first network node device that is overloaded due to first network communication devices connected to the first network node device being determined to have exceeded a connection threshold. The device can further comprise determining a second network node device that is available to establish first connections with a group of the first network communication devices connected to the first network node device. The device can further comprise identifying a third network node device that is transferring second network communication devices to the first network node device to create additional connections with the first network node device. The device can further comprise transmitting a first parameter to the third network node device to facilitate a reduction in the transferring of the second network communication devices to the first network node device, and a second parameter to the second network node device to facilitate increase in establishment of the first connections of the group of the first network communication devices.

These and other embodiments or implementations are described in more detail below with reference to the drawings. Repetitive description of like elements employed in the figures and other embodiments described herein is omitted for sake of brevity.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, pico-cell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
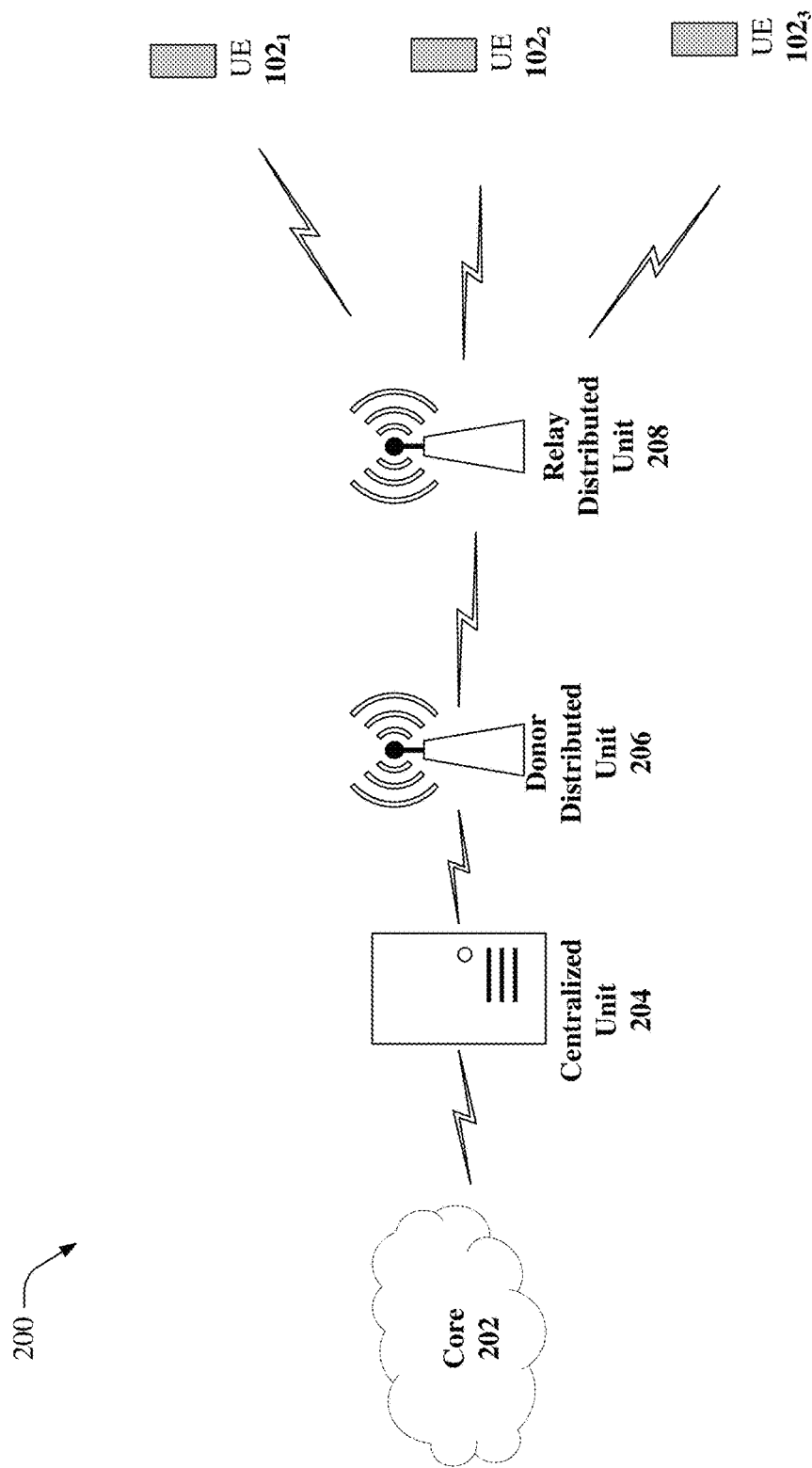
FIG. 2 illustrates an example schematic system block diagram of integrated access and backhaul links according to one or more embodiments.

Referring now to FIG. 2, illustrated is an example schematic system block diagram of integrated access and backhaul links according to one or more embodiments. For example, the network 200, as represented in FIG. 2 with integrated access and backhaul links, can allow a relay node to multiplex access and backhaul links in time, frequency, and/or space (e.g. beam-based operation). Thus, FIG. 2 illustrates a generic IAB set-up comprising a core network 202, a centralized unit 204, a donor distributed unit 206, a relay distributed unit 208, and UEs 1021, 1022, 1023. The donor distributed unit 206 (e.g., access point) can have a wired backhaul with a protocol stack and can relay the user traffic for the UEs 1021, 1022, 1023 across the IAB and backhaul link. Then the relay distributed unit 208 can take the backhaul link and convert it into different strains for the connected UEs 1021, 1022, 1023. Although FIG. 2 depicts a single hop (e.g., over the air), it should be noted that multiple backhaul hops can occur in other embodiments.

The relays can have the same type of distributed unit structure that the gNode B has. For 5G, the protocol stack can be split, where some of the stack is centralized. For example, the PDCP layer and above can be at the centralized unit 204, but in a real time application part of the protocol stack, the radio link control (RLC), the medium access control (MAC), and the physical layer PHY can be co-located with the base station wherein the system can comprise an F1 interface. In order to add relaying, the F1 interface can be wireless so that the same structure of the donor distributed unit 206 can be kept.

Figure 3:
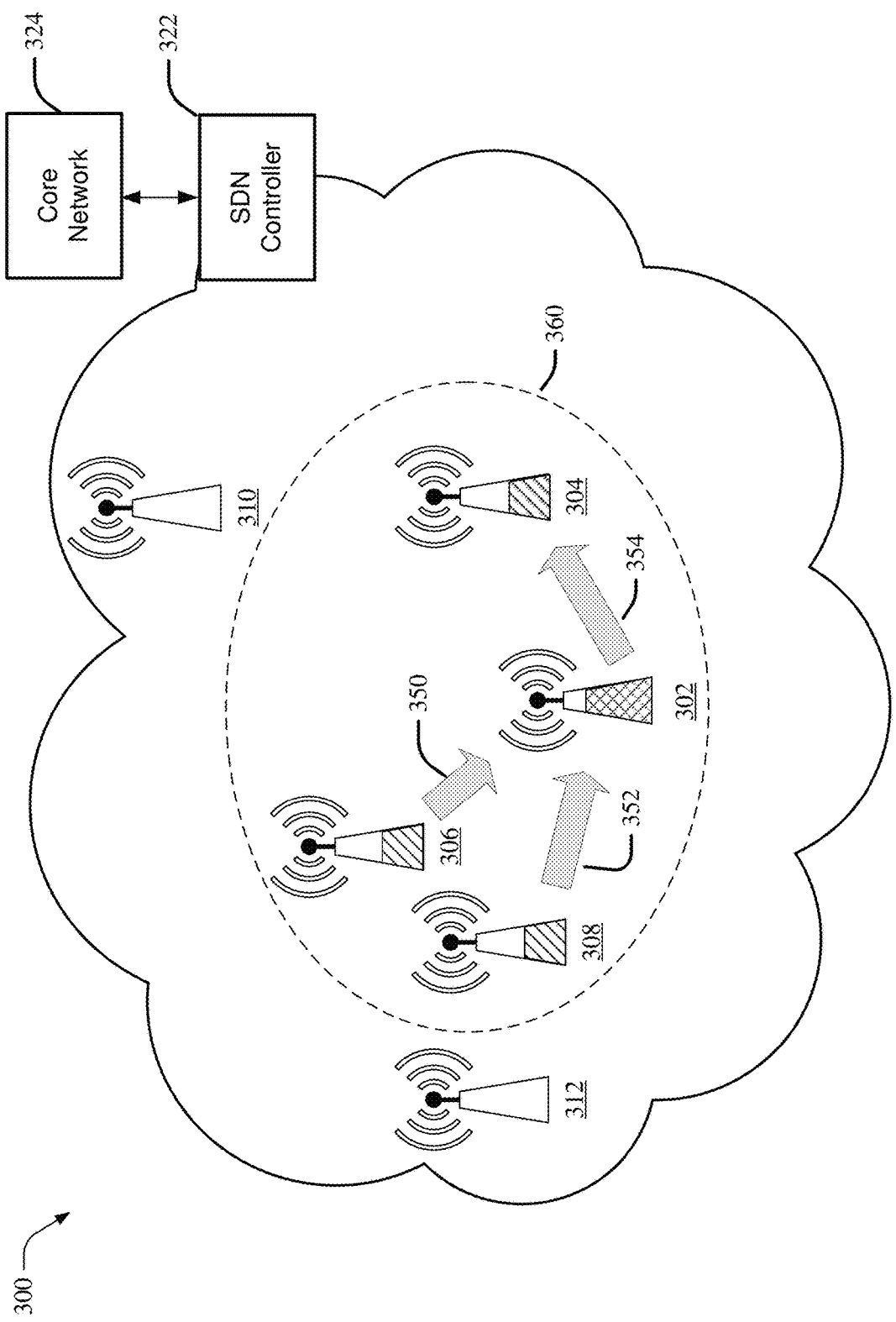
FIG. 3 illustrates an example of a wireless network in accordance with various aspects and embodiments described herein.

Referring now to FIG. 3, illustrated is an example of a wireless network (e.g., 5G LTE-NR or other next generation wireless network) 300 in accordance with various aspects and embodiments described herein. The wireless network 300 can comprise several network node devices (e.g., e/gNodeB, base station, etc.) 302-312. All the network node devices are communicatively connected to a core network 320 through the SDN controller. In some embodiments, one or devices of the core network 320, including the SDN controller 322 can monitor load value and/or congestion status of all the network node devices 302-312 and take appropriate action to reduce the load. In some embodiments, the network node device 302 is illustrated as being overloaded (e.g., a congested/problem device, wherein number of connected UEs has reached a threshold, for example 70% of node device capacity). The network node device can be considered overloaded for example, but not limited to, if the number of UE connected is over a threshold or based on performance indicators indicating that utilization of a physical downlink control channel, control channel elements of a network node devices has reached above a pre-defined threshold (e.g., over 70%). The network device 304 is considered as an outgoing network node device (e.g., a second network node device) that is available to take some of the UE connection from the congested network node device 302. The SDN controller can conduct measurements to determine if the outgoing network node device 304 is available to receive additional connection without reaching its own overload connection threshold. Also, the SDN controller 322 can analyze geo-location relationships with the problem device 302 before selecting the outgoing device to transfer some of the UE connection from the problem device 302. The transferring at least some of the UE connections is illustrated as 354. The network devices 306 and 308 are considered to incoming devices (e.g., third network node devices). The incoming devices 306 and 308 increase the load capacity of the congested device 302 by transferring additional UEs to connect with the congested device 302. The incoming connections are illustrated as 350 and 352. In accordance with some embodiments, the outgoing devices 304 and 306, and the incoming device 304 are located with a geographical location illustrated by 360. In some embodiments, the SDN controller 322 may select one or more incoming devices located within the geographical boundary 360. The identity and priority of incoming and outgoing network devices can also be identified using handover neighbor relations (configuration management database) and historical handover counts (performance management database) between network devices. Other methods of identity and priority of incoming and outgoing network devices can be used. If there are no network devices located within the geographical location 360, then the SDN controller can select other devices 310 and/or 312 as incoming devices for receiving UE connections from the problem devices.

Figure 4:
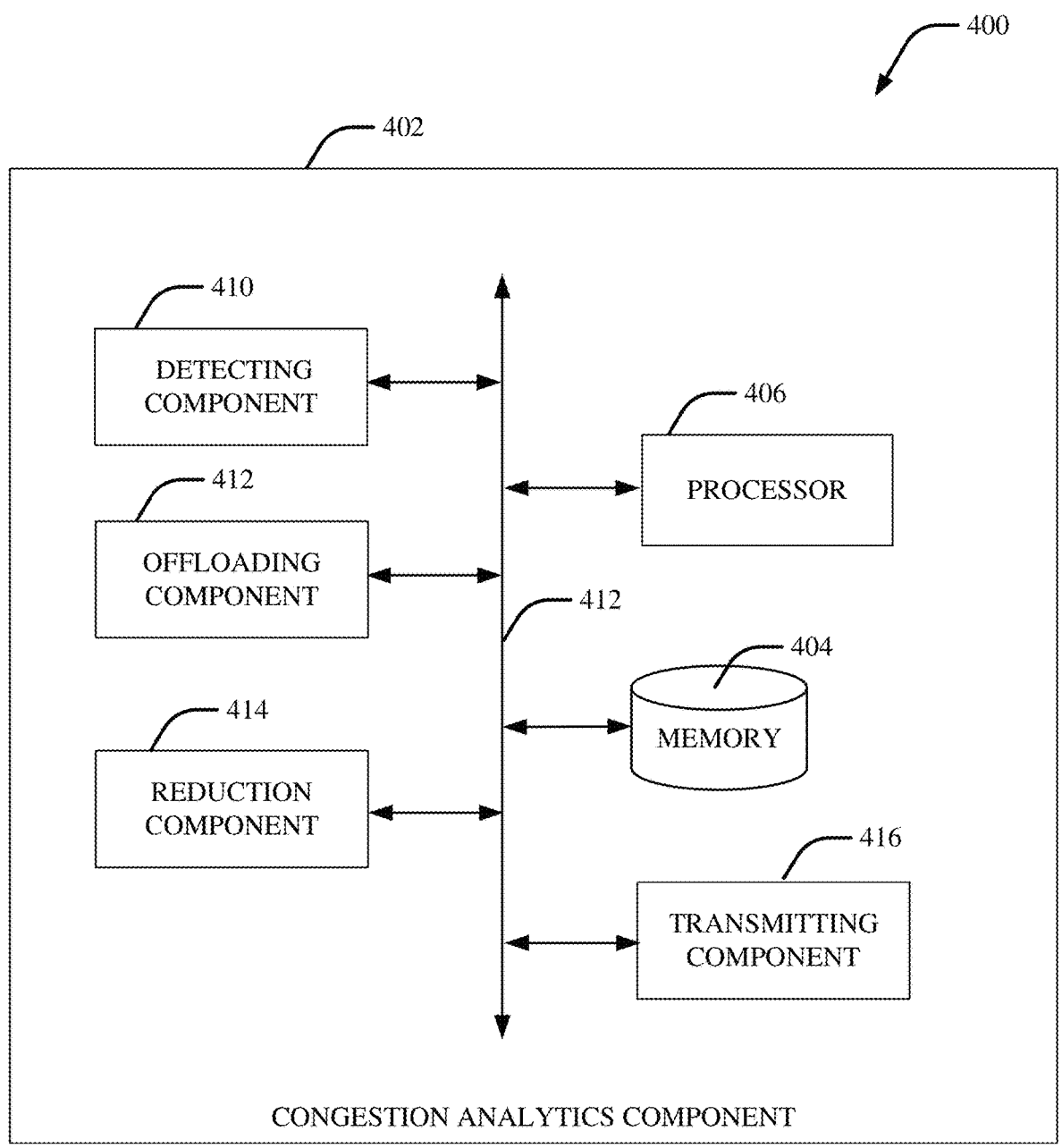
FIG. 4 illustrates a block diagram of an example, non-limiting system that facilitates management of network node devices that are overload.

FIG. 4 illustrates a block diagram of an example, non-limiting system 400 that facilitates management of network node devices that are overload in accordance with one or more embodiments described herein. According to some embodiments, the system 400 can comprise a congestion analytics component 402. In some embodiments, the congestion analytics component 402 can also include or otherwise be associated with a memory 404, a processor 406 that executes computer executable components stored in a memory 404. The congestion analytics component 402 can further include a system bus 408 that can couple various components including, but not limited to, a detecting component 410, an offloading component 412, a reduction component 414 and a transmitting component 416.

Aspects of systems (e.g., the congestion analytics component 402 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the congestion analytics component 402 can comprise various computer and/or computing-based elements described herein with reference to operating environment 1100 and FIG. 11. In several embodiments, such computer and/or computing-based elements can be used in connection with implementing one or more of the systems, devices, and/or components shown and described in connection with FIG. 4 or other figures disclosed herein.

According to several embodiments, the memory 404 can store one or more computer and/or machine readable, writable, and/or executable components and/or instructions that, when executed by processor 406, can facilitate performance of operations defined by the executable component(s) and/or instruction(s). For example, the memory 404 can store computer and/or machine readable, writable, and/or executable components and/or instructions that, when executed by the processor 406, can facilitate execution of the various functions described herein relating to the detecting component 410, the offloading component 412, the reduction component 414 and the transmitting component 416.

In several embodiments, the memory 404 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 404 are described below with reference to system memory 1106 and FIG. 11. Such examples of memory 404 can be employed to implement any embodiments of the subject disclosure.

According to some embodiments, the processor 406 can comprise one or more types of processors and/or electronic circuitry that can implement one or more computer and/or machine readable, writable, and/or executable components and/or instructions that can be stored on the memory 404. For example, the processor 406 can perform various operations that can be specified by such computer and/or machine readable, writable, and/or executable components and/or instructions including, but not limited to, logic, control, input/output (I/O), arithmetic, and/or the like. In some embodiments, processor 406 can comprise one or more central processing unit, multi-core processor, microprocessor, dual microprocessors, microcontroller, System on a Chip (SOC), array processor, vector processor, and/or another type of processor.

In some embodiments, the processor 406, the memory 404, the detecting component 410, the offloading component 412, the reduction component 414 and the transmitting component 416 can be communicatively, electrically, and/or operatively coupled to one another via the system bus 408 to perform functions of the congestion analytics component 402, and/or any components coupled therewith. In several embodiments, the system bus 408 can comprise one or more memory bus, memory controller, peripheral bus, external bus, local bus, and/or another type of bus that can employ various bus architectures.

In several embodiments, the congestion analytics component 402 can comprise one or more computer and/or machine readable, writable, and/or executable components and/or instructions that, when executed by the processor 406, can facilitate performance of operations defined by such component(s) and/or instruction(s). Further, in numerous embodiments, any component associated with the congestion analytics component 402, as described herein with or without reference to the various figures of the subject disclosure, can comprise one or more computer and/or machine readable, writable, and/or executable components and/or instructions that, when executed by the processor 406, can facilitate performance of operations defined by such component(s) and/or instruction(s). For example, the detecting component 410, and/or any other components associated with the congestion analytics component 402 (e.g., communicatively, electronically, and/or operatively coupled with and/or employed by Congestion analytics component 402), can comprise such computer and/or machine readable, writable, and/or executable component(s) and/or instruction(s). Consequently, according to numerous embodiments, the congestion analytics component 402 and/or any components associated therewith, can employ the processor 406 to execute such computer and/or machine readable, writable, and/or executable component(s) and/or instruction(s) to facilitate performance of one or more operations described herein with reference to the congestion analytics component 402 and/or any such components associated therewith.

In some embodiments, the congestion analytics component 402 can facilitate performance of operations related to and/or executed by the components of congestion analytics component 402, for example, the processor 406, the memory 404, the detecting component 410, the offloading component 412, the reduction component 414 and the transmitting component 416. For example, as described in detail below, the congestion analytics component 402 can facilitate: detecting (e.g., by the detecting component 410) a first network node device that is overloaded due to a number of a first group of first network communication devices connected to the first network node device being determined to have exceeded a connection threshold; selecting (e.g., by the offloading component 412) a second network node device comprising resources available to create first connections with at least some of the first group of first network communication devices connected to the first network node device; identifying (e.g., by the reduction component 414) a third network node device that is transferring a second group of second network communication devices, different than the first group of first network communication devices, to the first network node device to create second connections with the first network node device; and transmitting (e.g., by the transmitting component 416) a first parameter to the third network node device to facilitate a reduction in the transferring of the second group of second network communication devices to the first network node device, and a second parameter to the second network node device to facilitate increase in establishment of the first connections of the first group of first network communication devices with the second network node device.

In some embodiments, the detecting component 410, can comprise one or more processors, memory, and electrical circuitry. The detecting component 410 detects at least one of the network node devices that is overloaded. For example, a first network node (e.g., congested device 302) is overloaded due to number of first network communication devices (e.g., UE devices or mobile handsets) connected to it and the system (e.g., congestion analytics component 402) has determined that total number of UE devices connected to it has exceeded a connection threshold. In some embodiments, the overload condition is identified when the total number connections are using up resources over a threshold (e.g., 70% or more). In another embodiment, the overload condition is identified if number connections being rejected is over a threshold.

In some embodiments, the detecting component 410 may utilize, for example a detection mechanism, additional components (not shown) to find a congested network node device (the network node device 302 or cell of the network node device 302 that is overloaded) condition. A network node device may comprise one or more cells. Each cell may accept connection from UE. When network node device is considered congested, it may be due on of the cell being congested. Therefore, when referencing an overloaded cell, in some embodiments, it is considered that the network node device is congested or overloaded. In some embodiments, the overloaded cell may implement techniques described herein for cell to cell transfer to reduce the congestion. The detection may be based on cell level performance, but not limited to, indicators measuring PDCCH CCE utilization. (or other selected by user cell load utilization metric). The detection mechanism monitors PDCCH CCE utilization (or other utilization or performance measures) of the cells in the network. As soon as the utilization at any cell reaches level above predefined by user threshold—for example 70%—such cell is classified as the problem cell (cell with overload condition). The detection mechanism informs and passes the name (or identity) of the overloaded cell and time of the overload conditions to a problem solution analytics (PSA) module having algorithms executed by the processor 310, the offloading component 412, the reduction component 414 and the transmitting component 416 for further processing to reduce congestion.

In some embodiments, once an overloaded cell has been identified or detected, the PSA module can retrieve the neighbor relation list (e.g., list of network node devices operating within a geographical location) of the overloaded network node device (e.g., also referred to a "cell"). For each neighbor cell and overloaded cell, the performance metrics are retrieved such as, but not limited to, neighbor cell's utilization (e.g., PDCCH CCE utilization), cell throughput, accessibility. For each neighbor relation with overloaded cell the number of mobility handover (HO) occurrences between overloaded cell and neighbor cell (e.g., in incoming and outgoing HO count). The performance metrics are retrieved for the time period which correspond to the time of the overload conditions and passed by the detection component 412.

In some embodiments, idle and active mode parameters and settings are retrieved for overloaded cell (e.g., a1a2searchThreshold, reference signal received power (RSRP) or reference signal received quality (RSRQ), a3offset, a3hysteresis), and each neighbor relation link (CIO—cell individual offset, e.g., qOffsetCellEUtran). The parameters are retrieved for the time when overload conditions at identified overloaded cell occurred.

The PSA module can retrieve geo-located RF measurements within a pre-defined distance range from the overloaded cell. These measurements are provided by any measurement reporting system, for example, but not limited to Carrier IQ, Arieso Viavi. The measurement reporting system can measure and store RSRP or RSRQ RF measurements with geographical locations of these measurements grouped into geographical area raster bins (i.e. using MGRS—Military Grid Reference System). The geo-located RF data comprises, for example: a geo-BIN identity, a measured cell ID, an averaged RSRQ (or RSRP) corresponding to a cell in a geo-BIN, and a number of measured instances of the RSRQ (or RSRP) in a geo-BIN and for a cell_ID. In some embodiments, a single geo-BIN can comprise at least one record where a record will contain information for either the overloaded cell or any cell from the neighbor list of the overloaded cell.

In some embodiments, the offloading component 412, can comprise one or more processors, memory, and electrical circuitry. The offloading component 412, selects a second network node device (e.g., outgoing network node device) comprising resources available to create first connections with at least some of the first network communication devices connected to the first network node device (e.g., the problem network node device). According to some embodiments, upon retrieval of measurements and parameters, the PSA can select one or more outgoing neighboring cells which have the highest traffic offload opportunity from the overloaded cell and available. The availability can be based on cell utilization, (e.g., PDCCH CCE utilization, is below defined threshold—for example 60%) and/or cell throughput is above defined threshold (e.g., above 1 Mbps). This verification determines which neighboring cells can be used to shift traffic (e.g., offload) from the overloaded cell.

In some embodiments, the reduction component 414, can comprise one or more processors, memory, and electrical circuitry. The reduction component 414, identifies a third network node device (e.g., incoming network node device) that is transferring a second group of second network communication devices (e.g., inflow of UE connections), different than the first network communication devices, to the first network node device (e.g., the congested network node device) to create second connections with the first network node device. The PSA can also select one or more incoming neighboring cells which have the highest number of HO incoming to the overloaded cell and cell utilization (for example PDCCH CCE utilization) is below defined threshold—e.g., 60%. The PSA identifies which neighboring cells can be used to reduce UE traffic inflow (e.g., UE connection coming/transferring in) to overloaded cell.

In some embodiments, the transmitting component 416, can comprise one or more processors, memory, and electrical circuitry. The transmitting component 416 transmits a first parameter (e.g., CIO) to the third network node device to facilitate a reduction in the transferring of the second group of second network communication devices to the first network node device, and a second parameter to the second network node device to facilitate increase in establishment of the first connections of the first network communication devices with the second network node device.

For offloading traffic, the traffic offload will be achieved by changing active and idle mode CIO parameters or cell hysteresis offset parameters on identified outgoing cell neighbor relation to make easy to reselect and hand over from the overloaded cell to outgoing cells (e.g., a parameter provided to the outgoing network node device (e.g., second network node device) to facilitate increase in establishment of connections of UE devices with the outgoing network node device (e.g., second network node device). Each CIO parameter adjustment to encourage reselect and handover from an overloaded cell to a less-loaded cell will be matched with reciprocal parameters to discourage handback from the same less-loaded cell back towards the same overloaded cell. This will reduce probability of ping-pong and instability. Each set of active mode CIO parameter adjustments shall be matched with an equivalent set of idle mode CIO parameter adjustments. This will match active and idle mode services areas, reduce probability of ping-pong and instability.

For reducing incoming traffic, the traffic can be reduced by changing active and idle mode CIO parameters or cell hysteresis offset parameters on identified neighbor relation to make more difficult to reselect and hand over from incoming cell to overloaded cell (e.g., parameter transmitted/provided to the outgoing network node device to facilitate a reduction in the transferring of the UE connections to the problem network node device). The new CIO parameter value is changed by 2 dB to make more difficult handovers to the overloaded cell. In some embodiments, the CIO value can be also derived by the calculating the offload opportunity based on IQI data and by applying predictive analytics model described below. Each CIO parameter adjustment to discourage reselect and handover from a less-loaded cell to an overloaded cell will be matched with reciprocal parameters to encourage handback from the overloaded cell back towards the less-loaded cell. This will reduce probability of ping-pong and instability. Each set of active mode CIO parameter adjustments shall be matched with an equivalent set of idle mode CIO parameter adjustments. This will match active and idle mode services areas, reduce probability of ping-pong and instability.

In some embodiments, an offloading opportunity can be calculated for each outgoing network node device using geo-located RF information. The offload opportunity is a total number of measured instances of the RSRQ (or RSRP) from geo-located RF data that qualify for a handover from the overloaded cell to outgoing neighboring cell. The qualification criteria is based on parameters which determine inter-cell handover condition, for example for A3event based HO: a1a2searchThreshold(RSRP or RSRQ), a3offset, a3hysteresis, Cell Individual Offset (CIO), qOffsetCellEUtran. For example, let the beginning Offload_Opportunity_ProblemCell_with_OutgoingCell_X=0. For every geo BIN that contains the overloaded cell measurements and signal level (RSRP or RSRQ) of the overloaded cell that is below a1a2searchThreshold, if RSRQ (or RSRP) of an Outgoing Cell_X in a geo BIN is greater than RSRP (or RSRQ) of the overloaded cell +a3offset+a3hysteresis-CIO, then increase Offload_Opportunity_ProblemCell_with_OutgoingCell_X by number of measured instances (of RSRP or RSRQ) of the overloaded cell. The offload opportunity value will change when CIO parameter is changed on a neighbor relation pair (e.g., overloaded cell—outgoing cell). By increasing or decreasing CIO value, the offload opportunity for each CIO value we can determine what CIO value provides highest offload opportunity for each neighbor relation.

In some embodiments, PSA can select the neighbor relations and their CIO parameters based on offload opportunity, predicted cell load and predicted cell throughput. For example, a machine learning model for predicting cell load (i.e. PDCCH CCE utilization) and cell throughput can be used determine the predicted cell load and predicted cell throughput. The model can be trained based on historical data where the input of the model (e.g., features) are measures which are correlated with cell load and cell throughput. The close correlation of the features (e.g., number of users in a cell (Uc), PRB utilization (Pc), Bandwidth of the cell (B), Data Volume (Vc), number of handovers into cell (HOc)) with cell load (Lc) and cell throughput (Tc) can be observed. In addition, the features of the model should be scalable based on the offload opportunity change measured with current parameters configuration (e.g., baseline) and by the percentage of the change of the offload opportunity with new set of parameters.

For example, let current offload opportunity based on CIO=C parameter from the overloaded cell A to outgoing cell B is: OFc=0. Let new CIO parameter CIO=Y. Based on this CIO the new offload opportunity is OFn=Q. The percentage of change of the offload opportunity can be OF_p=100% *(OFn−OFc)/Ofn. Based on OF_p the input features of the predictive model are adjusted for which new cell load and throughput can be predicted. Let Uc, Pc, Vc, HOc be current measured input features to the model and for the current offload opportunity Ofc of the overloaded cell. Let Un, Pn, Vn, HOn are new input features for the overloaded cell which are calculated as:

For Outgoing cells: Un=Uc+Uc*OF_p Pn=Pc+Pc*OF_p Vc=Vc+Vc*OF_p HOc=HOc+HOc*OF_p; and For Problem cells: Un=Uc−Uc*OF_p Pn=Pc−Pc*OF_p Vc=Vc−Vc*OF_p HOc=HOc−HOc*OF_p.

Having Un, Pn, Vc, HOc applied as the input to the predictive model, the throughput and cell load can be predicted for outgoing cells of overloaded cell. These predicted values will indicate what would be a cell load and a cell throughput if new CIO=Y is applied on a relation between the overloaded cell and selected outgoing cell. Knowing predicted cell load and throughput of the overloaded cell or outgoing cell for various CIO values will allow to select the best overloaded cell and outgoing cell relation with CIO value that will provide the best improvement of cell load and throughput in the overloaded cell and least cell load and throughput degradation in outgoing cell.

Figure 5:
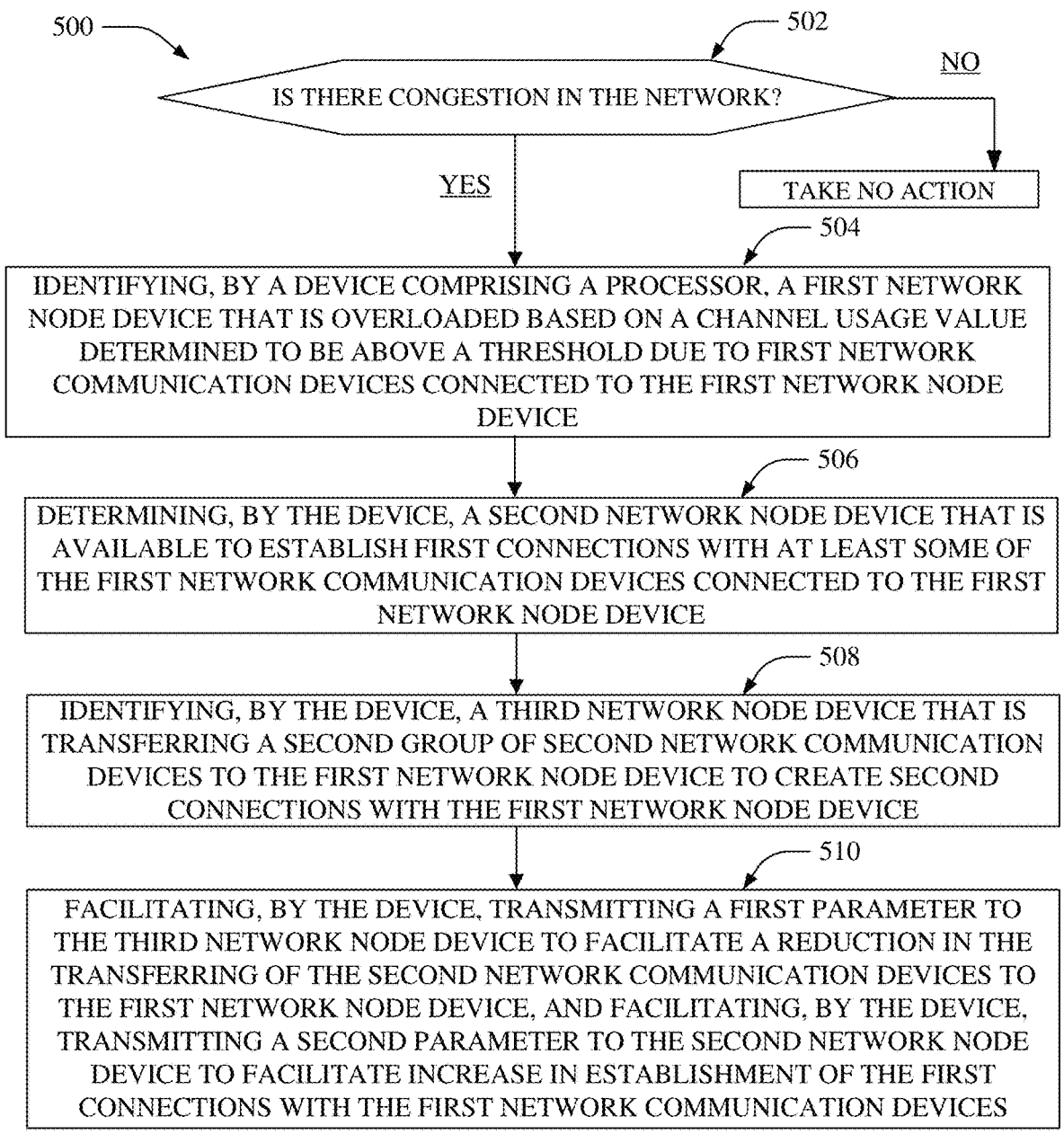
FIG. 5 depicts a diagram of an example, non-limiting computer implemented method that facilitates management of a network node device that is overloaded in accordance with one or more embodiments described herein.

FIG. 5 depicts a diagram of an example, non-limiting computer implemented method that facilitates management of a network node device that is overloaded in accordance with one or more embodiments described herein. In some examples, flow diagram 500 can be implemented by operating environment 1100 described below. It can be appreciated that the operations of flow diagram 500 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 5.

Operation 502 depicts determining if there is a congestion in the wireless network (e.g., at least one network node that is overloaded due to a large number of UE connection). If there is a congestion in the wireless network, then perform operation 504. Otherwise, take no action and continue monitoring. Operation 504 depicts identifying, by a device comprising a processor, a first network node device that is overloaded based on a channel usage value determined to be above a threshold due to first network communication devices connected to the first network node device (e.g., identifying a problem e/gNodeB or a network node device, congested device, having overload conditions). Operation 506 depicts determining, by the device, a second network node device that is available to establish first connections with at least some of the first network communication devices connected to the first network node device (e.g., finding at least one available network node device or e/gNodeB, donor device, for shifting some of the connections from the congested device). Operation 508 depicts identifying, by the device, a third network node device that is transferring second network communication devices to the first network node device to create second connections with the first network node device (e.g., identify neighboring e/gNodeBs, incoming device(s), that are continuing requesting/sending/adding new UE connections to the congested device). Operation 510 depicts facilitating, by the device, transmitting a first parameter to the third network node device to facilitate a reduction in the transferring of the second network communication devices to the first network node device, and facilitating, by the device, transmitting a second parameter to the second network node device to facilitate increase in establishment of the first connections with the first network communication devices (e.g., transmit parameters to the donor network node device or e/gNodeB, donor device, so that the donor device can accept more connections and transmit parameters, to the incoming device that is sending additional connections, requesting to reduce the amount of connections being sent to the problem device).

Figure 6:
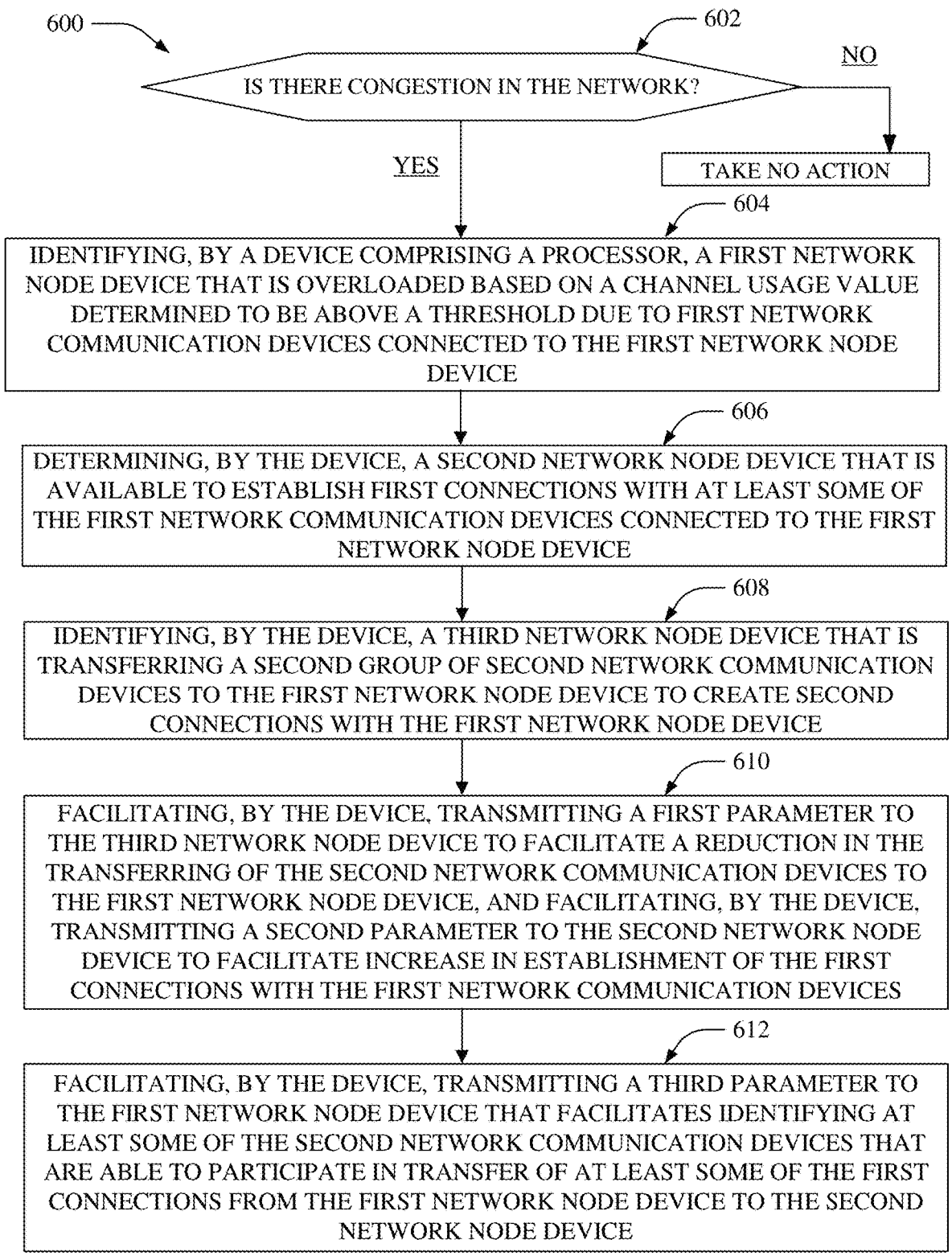
FIG. 6 depicts a diagram of an example, non-limiting computer implemented method that facilitates management of a network node device that is overloaded in accordance with one or more embodiments described herein.

FIG. 6 depicts a diagram of an example, non-limiting computer implemented method that facilitates management of a network node device that is overloaded in accordance with one or more embodiments described herein. In some examples, flow diagram 600 can be implemented by operating environment 1100 described below. It can be appreciated that the operations of flow diagram 600 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts determining if there is a congestion in the wireless network (e.g., at least one network node that is overloaded due to a large number of UE connection). If there is a congestion in the wireless network, then perform operation 604. Otherwise, take no action and continue monitoring. Operation 604 depicts identifying, by a device comprising a processor, a first network node device that is overloaded based on a channel usage value determined to be above a threshold due to first network communication devices connected to the first network node device (e.g., identifying a problem e/gNodeB or a network node device, congested device, having overload conditions). Operation 606 depicts determining, by the device, a second network node device that is available to establish first connections with at least some of the first network communication devices connected to the first network node device (e.g., finding at least one available network node device or e/gNodeB, donor device, for shifting some of the connections from the congested device). Operation 608 depicts identifying, by the device, a third network node device that is transferring second network communication devices to the first network node device to create second connections with the first network node device (e.g., identify neighboring e/gNodeBs, incoming device(s), that are continuing requesting/sending/adding new UE connections to the congested device). Operation 610 depicts facilitating, by the device, transmitting a first parameter to the third network node device to facilitate a reduction in the transferring of the second network communication devices to the first network node device, and facilitating, by the device, transmitting a second parameter to the second network node device to facilitate increase in establishment of the first connections with the first network communication devices (e.g., transmit parameters to the donor network node device or e/gNodeB, donor device, so that the donor device can accept more connections and transmit parameters, to the incoming device that is sending additional connections, requesting to reduce the amount of connections being sent to the problem device). Operation 612 depicts facilitating, by the device, transmitting a third parameter to the first network node device that facilitates identifying at least some of the second network communication devices that are able to participate in transfer of at least some of the first connections from the first network node device to the second network node device.

Figure 7:
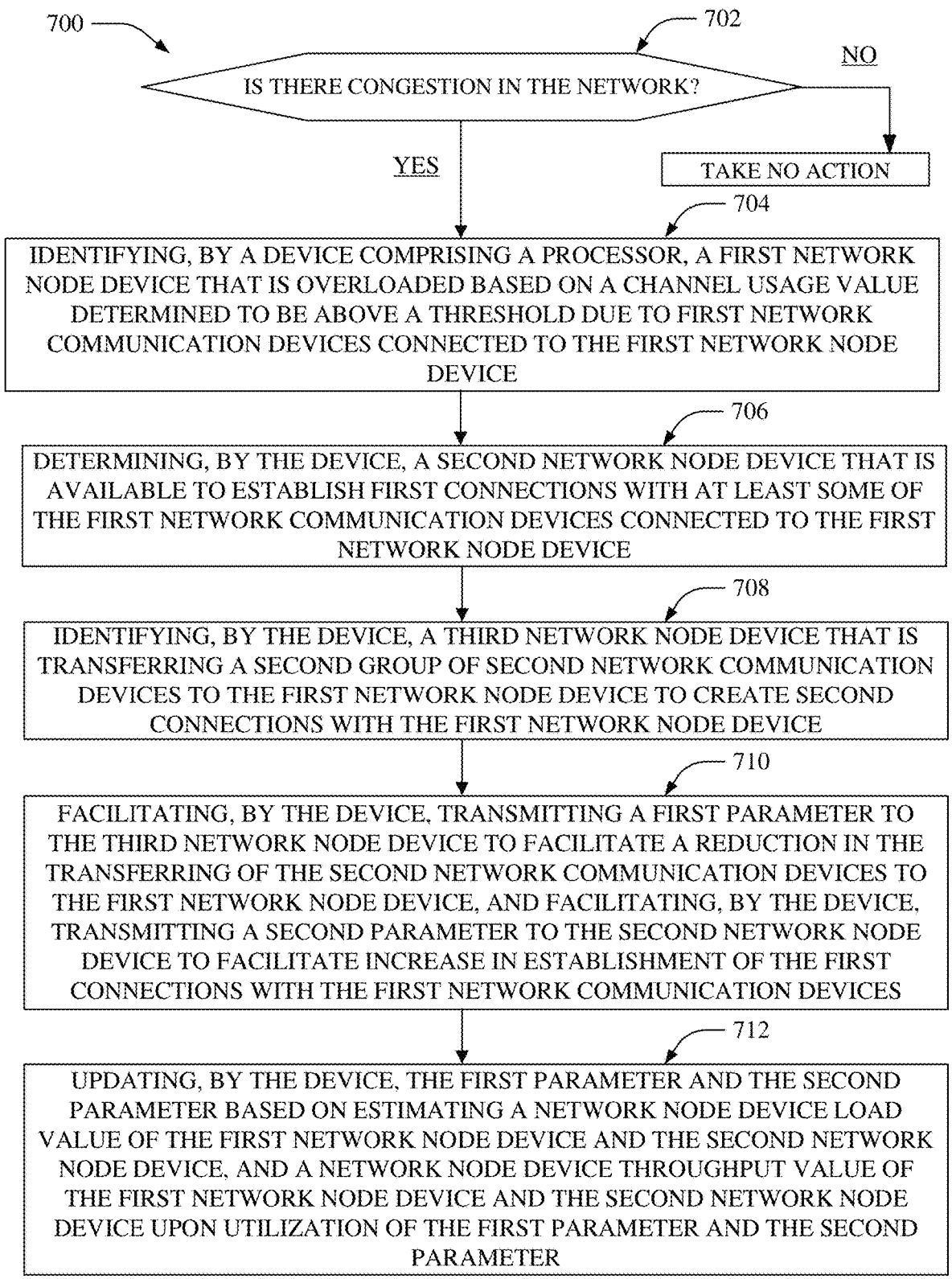
FIG. 7 depicts a diagram of an example, non-limiting computer implemented method that facilitates management of a network node device that is overloaded in accordance with one or more embodiments described herein.

FIG. 7 depicts a diagram of an example, non-limiting computer implemented method that facilitates management of a network node device that is overloaded in accordance with one or more embodiments described herein. In some examples, flow diagram 700 can be implemented by operating environment 1100 described below. It can be appreciated that the operations of flow diagram 700 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts determining if there is a congestion in the wireless network (e.g., at least one network node that is overloaded due to a large number of UE connection). If there is a congestion in the wireless network, then perform operation 704. Otherwise, take no action and continue monitoring. Operation 704 depicts identifying, by a device comprising a processor, a first network node device that is overloaded based on a channel usage value determined to be above a threshold due to first network communication devices connected to the first network node device (e.g., identifying a problem e/gNodeB or a network node device, congested device, having overload conditions). Operation 706 depicts determining, by the device, a second network node device that is available to establish first connections with at least some of the first network communication devices connected to the first network node device (e.g., finding at least one available network node device or e/gNodeB, donor device, for shifting some of the connections from the congested device). Operation 708 depicts identifying, by the device, a third network node device that is transferring second network communication devices to the first network node device to create second connections with the first network node device (e.g., identify neighboring e/gNodeBs, incoming device(s), that are continuing requesting/sending/adding new UE connections to the congested device). Operation 710 depicts facilitating, by the device, transmitting a first parameter to the third network node device to facilitate a reduction in the transferring of the second network communication devices to the first network node device, and facilitating, by the device, transmitting a second parameter to the second network node device to facilitate increase in establishment of the first connections with the first network communication devices (e.g., transmit parameters to the donor network node device or e/gNodeB, donor device, so that the donor device can accept more connections and transmit parameters, to the incoming device that is sending additional connections, requesting to reduce the amount of connections being sent to the problem device). Operation 712 depicts updating, by the device, the first parameter and the second parameter based on estimating a network node device load value of the first network node device and the second network node device, and a network node device throughput value of the first network node device and the second network node device upon utilization of the first parameter and the second parameter.

Figure 8:
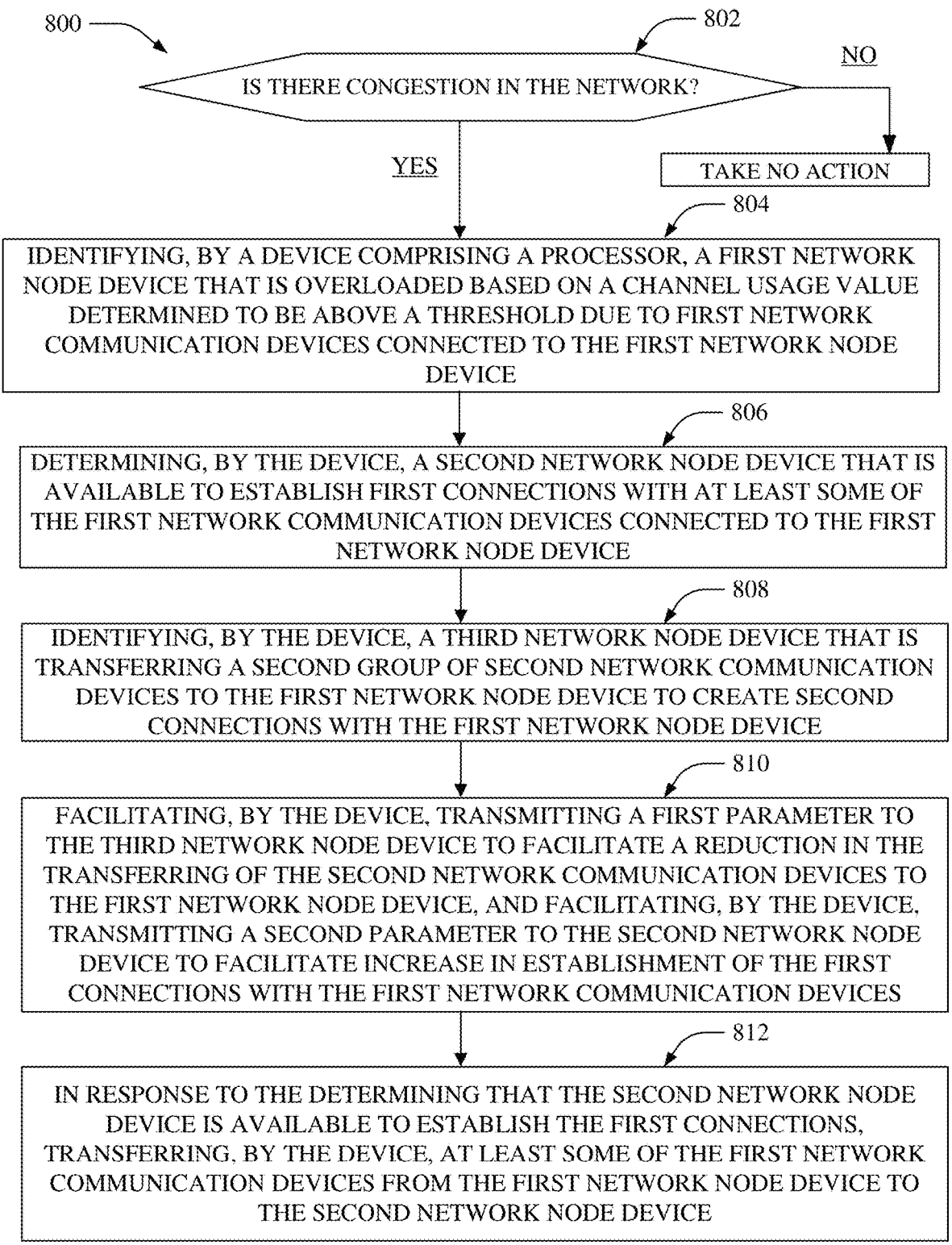
FIG. 8 depicts a diagram of an example, non-limiting computer implemented method that facilitates management of a network node device that is overloaded in accordance with one or more embodiments described herein.

FIG. 8 depicts a diagram of an example, non-limiting computer implemented method that facilitates management of a network node device that is overloaded in accordance with one or more embodiments described herein. In some examples, flow diagram 800 can be implemented by operating environment 1100 described below. It can be appreciated that the operations of flow diagram 800 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts determining if there is a congestion in the wireless network (e.g., at least one network node that is overloaded due to a large number of UE connection). If there is a congestion in the wireless network, then perform operation 804. Otherwise, take no action and continue monitoring. Operation 804 depicts identifying, by a device comprising a processor, a first network node device that is overloaded based on a channel usage value determined to be above a threshold due to first network communication devices connected to the first network node device (e.g., identifying a problem e/gNodeB or a network node device, congested device, having overload conditions). Operation 806 depicts determining, by the device, a second network node device that is available to establish first connections with at least some of the first network communication devices connected to the first network node device (e.g., finding at least one available network node device or e/gNodeB, donor device, for shifting some of the connections from the congested device). Operation 808 depicts identifying, by the device, a third network node device that is transferring second network communication devices to the first network node device to create second connections with the first network node device (e.g., identify neighboring e/gNodeBs, incoming device(s), that are continuing requesting/sending/adding new UE connections to the congested device). Operation 810 depicts facilitating, by the device, transmitting a first parameter to the third network node device to facilitate a reduction in the transferring of the second network communication devices to the first network node device, and facilitating, by the device, transmitting a second parameter to the second network node device to facilitate increase in establishment of the first connections with the first network communication devices (e.g., transmit parameters to the donor network node device or e/gNodeB, donor device, so that the donor device can accept more connections and transmit parameters, to the incoming device that is sending additional connections, requesting to reduce the amount of connections being sent to the problem device). Operation 812 depicts in response to the determining that the second network node device is available to establish the first connections, transferring, by the device, at least some of the first network communication devices from the first network node device to the second network node device.

Figure 9:
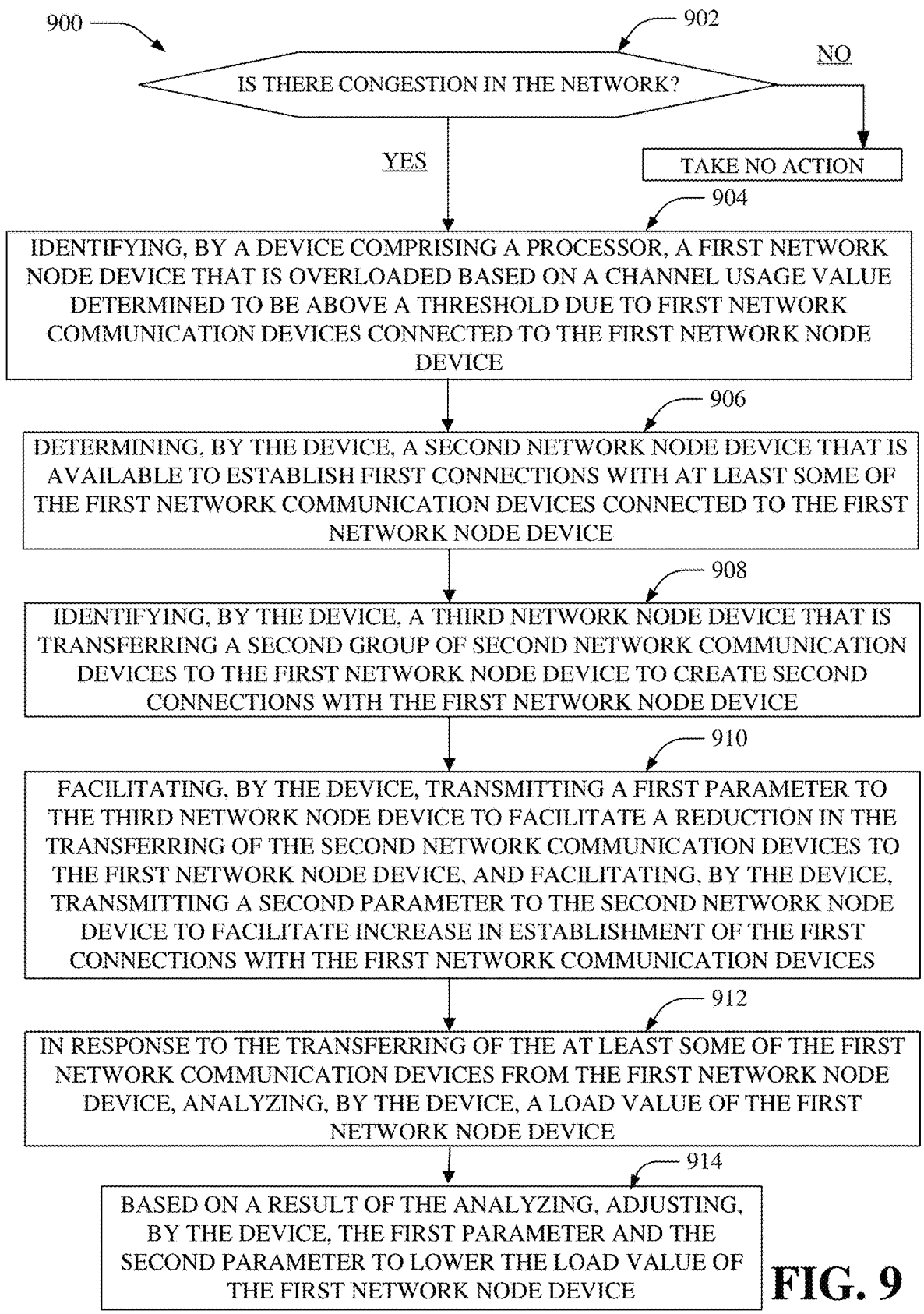
FIG. 9 depicts a diagram of an example, non-limiting computer implemented method that facilitates management of a network node device that is overloaded in accordance with one or more embodiments described herein.

FIG. 9 depicts a diagram of an example, non-limiting computer implemented method that facilitates management of a network node device that is overloaded in accordance with one or more embodiments described herein. In some examples, flow diagram 900 can be implemented by operating environment 1100 described below. It can be appreciated that the operations of flow diagram 900 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts determining if there is a congestion in the wireless network (e.g., at least one network node that is overloaded due to a large number of UE connection). If there is a congestion in the wireless network, then perform operation 904. Otherwise, take no action and continue monitoring. Operation 904 depicts identifying, by a device comprising a processor, a first network node device that is overloaded based on a channel usage value determined to be above a threshold due to first network communication devices connected to the first network node device (e.g., identifying a problem e/gNodeB or a network node device, congested device, having overload conditions). Operation 906 depicts determining, by the device, a second network node device that is available to establish first connections with at least some of the first network communication devices connected to the first network node device (e.g., finding at least one available network node device or e/gNodeB, donor device, for shifting some of the connections from the congested device). Operation 908 depicts identifying, by the device, a third network node device that is transferring second network communication devices to the first network node device to create second connections with the first network node device (e.g., identify neighboring e/gNodeBs, incoming device(s), that are continuing requesting/sending/adding new UE connections to the congested device). Operation 910 depicts facilitating, by the device, transmitting a first parameter to the third network node device to facilitate a reduction in the transferring of the second network communication devices to the first network node device, and facilitating, by the device, transmitting a second parameter to the second network node device to facilitate increase in establishment of the first connections with the first network communication devices (e.g., transmit parameters to the donor network node device or e/gNodeB, donor device, so that the donor device can accept more connections and transmit parameters, to the incoming device that is sending additional connections, requesting to reduce the amount of connections being sent to the problem device). Operation 912 depicts in response to the transferring of the at least some of the first network communication devices from the first network node device, analyzing, by the device, a load value of the first network node device. Operation 914 depicts based on a result of the analyzing, adjusting, by the device, the first parameter and the second parameter to lower the load value of the first network node device.

Figure 10:
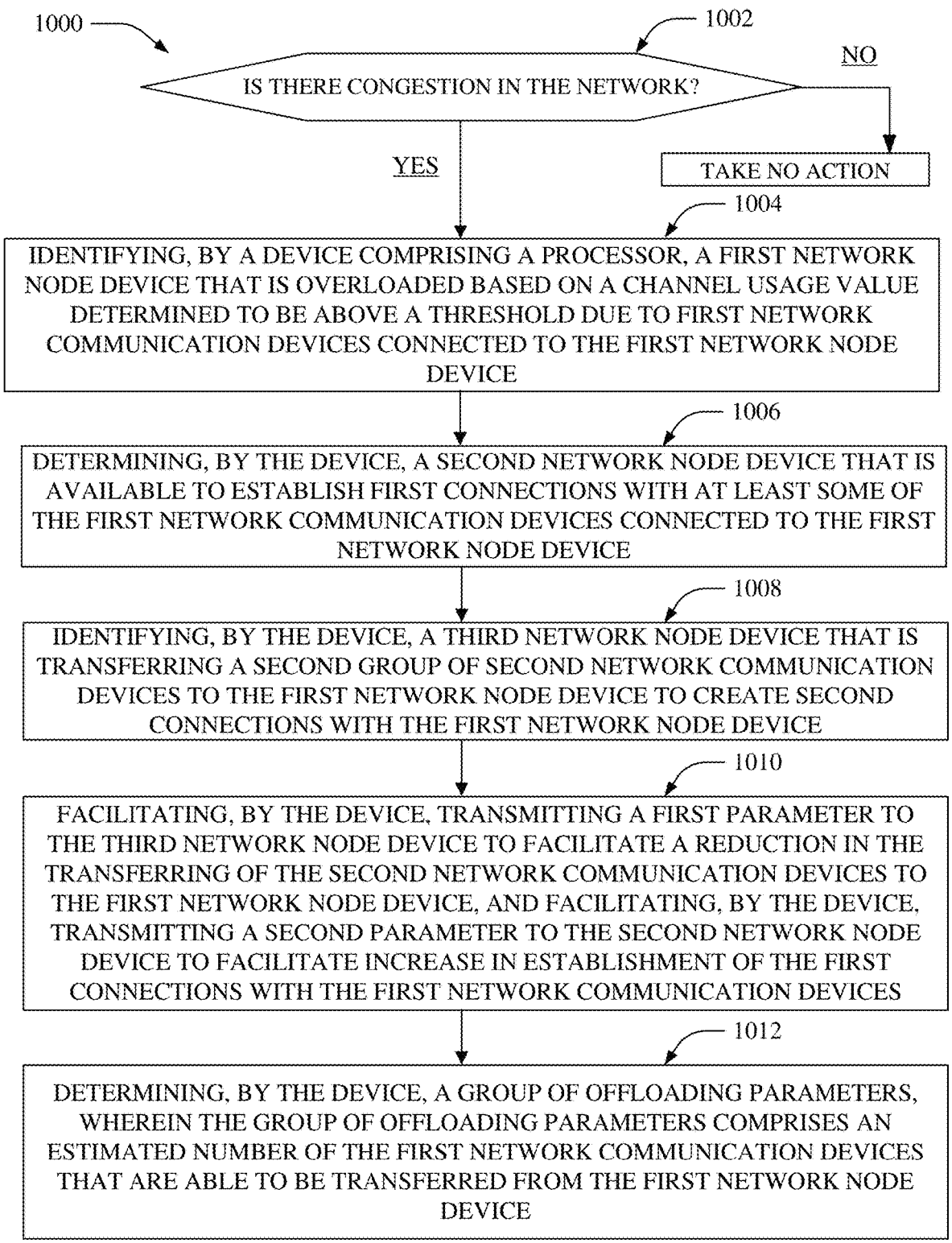
FIG. 10 depicts a diagram of an example, non-limiting computer implemented method that facilitates management of a network node device that is overloaded in accordance with one or more embodiments described herein.

FIG. 10 depicts a diagram of an example, non-limiting computer implemented method that facilitates management of a network node device that is overloaded in accordance with one or more embodiments described herein. In some examples, flow diagram 1000 can be implemented by operating environment 1100 described below. It can be appreciated that the operations of flow diagram 1000 can be implemented in a different order than is depicted.

In non-limiting example embodiments, a computing device (or system) (e.g., computer 1104) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 depicts determining if there is a congestion in the wireless network (e.g., at least one network node that is overloaded due to a large number of UE connection). If there is a congestion in the wireless network, then perform operation 1004. Otherwise, take no action and continue monitoring. Operation 1004 depicts identifying, by a device comprising a processor, a first network node device that is overloaded based on a channel usage value determined to be above a threshold due to first network communication devices connected to the first network node device (e.g., identifying a problem e/gNodeB or a network node device, congested device, having overload conditions). Operation 1006 depicts determining, by the device, a second network node device that is available to establish first connections with at least some of the first network communication devices connected to the first network node device (e.g., finding at least one available network node device or e/gNodeB, donor device, for shifting some of the connections from the congested device). Operation 1008 depicts identifying, by the device, a third network node device that is transferring second network communication devices to the first network node device to create second connections with the first network node device (e.g., identify neighboring e/gNodeBs, incoming device(s), that are continuing requesting/sending/adding new UE connections to the congested device). Operation 1010 depicts facilitating, by the device, transmitting a first parameter to the third network node device to facilitate a reduction in the transferring of the second network communication devices to the first network node device, and facilitating, by the device, transmitting a second parameter to the second network node device to facilitate increase in establishment of the first connections with the first network communication devices (e.g., transmit parameters to the donor network node device or e/gNodeB, donor device, so that the donor device can accept more connections and transmit parameters, to the incoming device that is sending additional connections, requesting to reduce the amount of connections being sent to the problem device). Operation 1012 depicts determining, by the device, a group of offloading parameters, wherein the group of offloading parameters comprises an estimated number of the first network communication devices that are able to be transferred from the first network node device (e.g., an offloading opportunity to estimate how many devices that should be offloaded prior to actually offloading the devices). In some embodiments, a problem solution analytics may be used to calculate offload opportunity for each outgoing neighboring cell using geo-located RF information.

Figure 11:
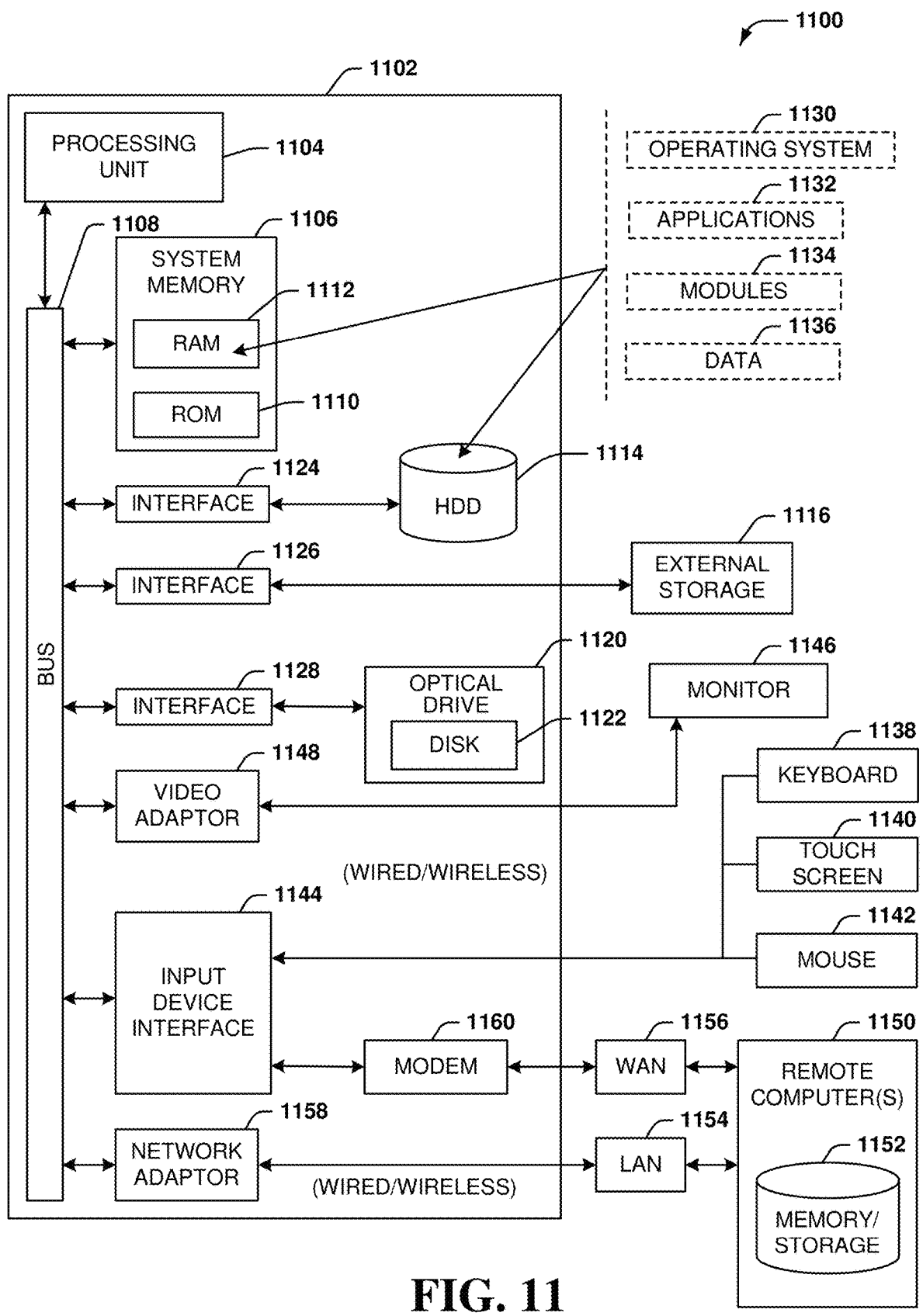
FIG. 11 illustrates an example block diagram of an example computer operable to engage in a system architecture that facilitates secure wireless communication according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server and/or communication device.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, comprising:
   determining that a first network node device satisfies an overload criterion related to a quantity of first network communication devices connected to the first network node device;
   identifying a second network node device that is initiating handovers of second network communication devices, different than the first network communication devices, to the first network node device;
   transmitting a first parameter to the second network node device to facilitate a reduction in the handovers of the second network communication devices to the first network node device;
   selecting a third network node device that satisfies an availability threshold;
   transmitting a second parameter to the third network node device to facilitate a handover of the handovers of a network communication device of the first network communication devices to the third network node device;
   in response to the handover of the network communication device to the third network node device, analyzing a load value of the first network node device; and
   adjusting the first parameter and the second parameter to modify the load value of the first network node device.

2. The system of claim 1, wherein the determining that the first network node device satisfies the overload criterion comprises utilizing a predictive model to predict a load value of the first network node device.

3. The system of claim 1, wherein the selecting of the third network node device that satisfies the availability threshold comprises utilizing a predictive model to predict a load value of the third network node device.

4. The system of claim 1, wherein the operations further comprise:
   transmitting a third parameter to the first network node device, wherein the third parameter is utilized to facilitate the handover of the network communication device to the third network node device.

5. The system of claim 1, wherein the operations further comprise:
   in response to the determining that the first network node device satisfies the overload criterion, requesting channel measurements from neighboring network node devices located within a geographical area.

6. The system of claim 5, wherein the requesting of the channel measurements from the neighboring network node devices located within a geographical area comprises requesting the channel measurements from the neighboring network node devices located within a geographical area and that satisfy a defined availability criterion.

7. A method, comprising:
   detecting, by a device comprising a processor, a first base station that is overloaded based on an overload threshold due to first user equipment connected to the first base station;

identifying, by the device, a second base station that is transferring second user equipment to the first base station;

facilitating, by the device, transmitting a first parameter to the second base station to facilitate a reduction in the transferring of the second user equipment to the first base station;

selecting, by the device, a third base station that satisfies an availability threshold;

facilitating, by the device, transmitting a second parameter to the third base station to facilitate transfer of a user equipment of the first user equipment to the second base station;

in response to the transfer of the user equipment to the third base station, analyzing, by the device, a load of the first base station; and adjusting, by the device, the first parameter and the second parameter to modify the load of the first base station.

8. The method of claim 7, wherein the detecting that the first base station is overloaded based on the overload threshold comprises predicting, via a predictive model, a load of the first base station.

9. The method of claim 7, wherein the selecting of the third base station that satisfies the availability threshold comprises utilizing a predictive model to predict a load value of the third base station.

10. The method of claim 7, further comprising:
facilitating, by the device, transmitting a third parameter to the first base station, wherein the third parameter facilitates the transfer of the user equipment to the third base station.

11. The method of claim 7, further comprising:
in response to the detecting that the first base station is overloaded based on the overload threshold, requesting, by the device, channel measurements from neighboring base stations satisfying a defined qualification criterion.

12. The method of claim 11, wherein the defined qualification criterion comprises a threshold base station throughput.

13. The method of claim 11, wherein the defined qualification criterion comprises a threshold base station utilization.

14. A non-transitory machine-readable medium, comprising executable instructions that, when executed by a processor, facilitate performance of operations, comprising:

identifying a first access point that satisfies an overload criterion related to a quantity of first mobile devices connected to the first access point being determined to have exceeded a connection threshold;

detecting a second access point that is transferring second mobile devices, different than the first mobile devices, to the first access point;

sending a first parameter to the second access point to facilitate a reduction in the transferring of the second mobile devices to the first access point;

selecting a third access point that satisfies an availability threshold;

transmitting a second parameter to the third access point to facilitate a transfer of a mobile device of the first mobile devices to the second access point;

in response to the transfer of the mobile device to the third access point, analyzing a load value of the first access point; and adjusting the first parameter and the second parameter to modify the load value of the first access point.

15. The non-transitory machine-readable medium of claim 14, wherein the identifying the first access point that satisfies the overload criterion comprises predicting, via a predictive model, a load metric of the first access point.

16. The non-transitory machine-readable medium of claim 14, wherein the selecting of the third access point that satisfies the availability threshold comprises utilizing a predictive model to predict a load value of the third access point.

17. The non-transitory machine-readable medium of claim 14, wherein the operations further comprise:
transmitting a third parameter to the first access point, wherein the third parameter is utilized to facilitate the transfer of the mobile device to the third access point.

18. The non-transitory machine-readable medium of claim 14, wherein the operations further comprise:
in response to the detecting that the first access point is overloaded based on the overload threshold, requesting channel measurements from neighboring access points satisfying a defined criterion.

19. The non-transitory machine-readable medium of claim 18, wherein the criterion comprises a threshold access point throughput.

20. The non-transitory machine-readable medium of claim 18, wherein the criterion comprises a threshold access point utilization.

* * * * *